2,989,436
ALPHA-CHLOROPHENYL-BETA-CHLOROSUCCINIMIDE SEED COATING AND PLANT FOLIAGE FUNGICIDES

George E. O'Brien, East Haven, Conn., and Pliny O. Tawney, Passaic, N.J., assignors to United States Rubber Company, New York, N.Y., a corporation of New Jersey
No Drawing. Filed Sept. 23, 1958, Ser. No. 762,695
20 Claims. (Cl. 167—33)

This invention relates to new and useful improvements in fungicides, and more particularly fungicides for protecting plants. The term "plant" or "plants" is used herein as inclusive of the whole plant and various plant parts, such as seeds, flowers, fruits, vegetables and foliage.

We have found that alpha-chlorophenyl-beta-chlorosuccinimides, which may be represented by the following general formula, are effective fungicides:

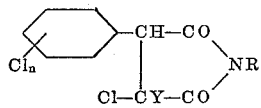

wherein $n$ is an integer which is 1, 2 or 3; Y is hydrogen or methyl; and R is hydrogen or alkyl. (The symbol $Cl_n$— has the conventional meaning that the chlorine or chlorines can substitute for any one, two, or three of the hydrogens of the phenyl group.)

The alpha-chlorophenyl-beta-chlorosuccinimides are known. Examples of the alpha-chlorophenyl-beta-chlorosuccinimides that may be used as fungicides according to the present invention are alpha-(2-chlorophenyl)-beta-chlorosuccinimide,
alpha-(4-chlorophenyl)-beta-chlorosuccinimide,
alpha-(2,4-dichlorophenyl)-beta-chlorosuccinimide,
alpha-(2,5-dichlorophenyl)-beta-chlorosuccinimide,
alpha-(2,4,6-trichlorophenyl)-beta-chlorosuccinimide,
alpha-(4-chlorophenyl)-beta-chloro-N-methylsuccinimide,
alpha-(2,4-dichlorophenyl) - beta-chloro-N-isopropylsuccinimide,
alpha-(2-chlorophenyl)-beta-chloro-N-hexylsuccinimide,
alpha-(2,4-dichlorophenyl) - beta-chloro-beta-methylsuccinimide,
alpha-(2,4-dichlorophenyl) - beta-chloro-beta-methyl-N-isopropylsuccinimide.

The chemicals may be applied to seeds by tumbling the chemical with the seed, either alone or in admixture with a powdered solid carrier. Typical powdered solid carriers are the various mineral silicates, e.g., mica, talc, pyrophyllite, and clays. The chemicals may also be applied to the seeds in admixture with a conventional surface-active wetting agent, with or without additional powdered solid carrier, as by first wetting the mixtures with a small amount of water and then tumbling the seeds in the slurry. The chemicals also may be applied as a liquid or spray in a liquid carrier, as in solution in a suitable solvent, or suspended in a siutable non-solvent, for example, water. The chemicals may be applied to growing plants by spraying with an aqueous suspension of the chemical containing a surface-active wetting agent which also acts to disperse the chemical. The chemicals also may be applied to growing plants as a dust in admixture with a powdered carrier. The chemicals may be admixed with powdered solid carriers, such as mineral silicates, together with small amounts of surface-active wetting agent so that a wettable powder is obtained which may be applied directly to plants to be protected against fungi, or which may be shaken up with water to form a suspension of the chemical (and powdered carrier) in water for application in that form. The chemicals may be applied to plants by the aerosol method. Aerosol solutions may be made by dissolving the chemicals directly in the carrier which is liquid under pressure, but which is a gas at ordinary temperatures (e.g., 20° C.) and atmospheric pressure, or these solutions may be made by first dissolving the chemical in a less volatile solvent and then mixing this solution with the highly volatile liquid aerosol carrier. The surface-active wetting agents that may be used with the chemicals of the present invention may be any of the conventional anionic surface-active agents, non-ionic surface-active agents, or cationic surface-active agents. Such surface-active agents are well known and reference is made to U.S. Patent No. 2,547,724, columns 3 and 4, for detailed examples of the same.

The following examples illustrate the invention. All parts and percentages are by weight.

Example 1

This example shows the use of these new fungicides as seed protectants.

Each material to be tested as a seed protectant is finely ground and applied dry at the rate (ounces per 100 lbs. of seed) shown below. The test material is distributed on the seed surface by tumbling the mixture of material and seed on a seed treatment wheel for 30 minutes. Using a planned randomization scheme, eight replicates of seed treated with the test material, eight replicates of seed treated in the same way with a standard fungicide, (2,3-dichloronaphthoquinone), and eight replicates of untreated seed are planted in flats containing naturally contaminated soil. Each replicate consists of 25 seeds which are nearly alike as possible. These flats are kept in a chamber at 50° F. and 100% humidity for 14 days, and then they are placed in a greenhouse. Stand counts are made after 7 to 10 days in the greenhouse.

The test chemical is rated in protective ability as follows. The difference in percentage germination between seeds treated with the 2,3-dichloronaphthoquinone and untreated seeds is divided into five equal segments. Each segment is assigned a letter from A to E. The test chemical is given a rating, depending on which segment the percentage germination of seeds treated therewith falls into. The following hypothetical example shows how a test chemical is rated. Let us assume that 80% of seed treated with 2,3-dichloronaphthoquinone germinate and that only 30% of untreated seed germinate. The difference, 50%, is divided into 5 segments of 10% each. Then the test chemical, in the same dosage as the standard, is rated on an A to E scale as follows:

A. Over 70% germination—note that a material rated A is at least substantially as good as the standard, and may be considerably better than the standard if the latter gives a germination percentage considerably below 100%.

B. Over 60% but not over 70% germination—an active fungicide not as good as the standard.

C. Over 50% but not over 60% germination—shows some fungicidal activity.

D. Over 40% but not over 50% germination—a very weak fungicide.

E. Not over 40% germination—shows substantially no fungicidal activity.

This relative scale is useful in comparing materials which are tested under different conditions, because each test is based on the rating of the test material against the standard and the control under the same conditions. Thus any material rated A in one test, e.g., in a particular soil, can be assumed to be in the same class as a material rated A in a different test, e.g., in a different soil, even though the percentage germination at, say, two ounces per 100 lbs. of seed may be 90 for one material and only 55 for another. Thus, ratings obtained in different laboratories under diverse conditions can be compared.

By this method the following chemicals are rated as seed protectants for corn.

| Chemical | Concentration oz./100 lbs. seed | Rating |
| --- | --- | --- |
| Alpha-(4-Chlorophenyl)-beta-chlorosuccinimide | 4 | A |
| Alpha-(2,4-Dichlorophenyl)-beta-chlorosuccinimide | 1 | A |

*Example 2*

This example shows the use of the new fungicides as protectants for foliage on growing plants.

Each material to be tested is ground with a surface-active agent known to have no fungicidal or fungistatic properties in the amounts used. The surface-active agent is a commercially available non-ionic surface-active agent, which is a condensation product of an alkylphenol and ethylene oxide, but there is nothing critical about the use of this particular surface-active agent. Ten parts are used per 100 parts of the test chemical, but the amount is not critical. The mixture of test material and surface-active agent is dispersed in distilled water at the concentration of fungicide shown (parts fungicide per million parts of water) and is thoroughly agitated in a colloid mill. Duplicate six-inch tomato plants of the variety Bonny Best are sprayed for 20 seconds at 20 p.s.i. with the agitated dispersion of any one test material. After the spray deposit is thoroughly dry (24 hours) the plants and four comparable unprotected plants are sprayed with an aqueous suspension of spores of the early blight fungus (*Alternaria solani*). Before removal to the greenhouse, the plants are held for 24 hours at 21° C. and 100% humidity to permit spore germination and host infection. Five days later the lesions produced on the 15 major leaflets of the three youngest, fully expanded leaves of each plant are counted. These data are converted to percentage of control by the best material relative to the average number of lesions on the control plants.

The results of these tests are as follows:

| Chemical | Concentration (parts/million) | Percentage Control |
| --- | --- | --- |
| Alpha-(4-Chlorophenyl)-beta-chlorosuccinimide | 100 | 47 |
| Alpha-(2,4-Dichlorophenyl)-beta-chlorosuccinimide | 63 | 98 |
| Alpha-(2,4-Dichlorophenyl)-beta-chlorosuccinimide | 125 | 100 |
| Alpha-(2-Chlorophenyl)-beta-chlorosuccinimide | 500 | 98 |
| Alpha-(2,5-Dichlorophenyl)-beta-chlorosuccinimide | 500 | 90 |
| Alpha-(2,4,6-Trichlorophenyl)-beta-chlorosuccinimide | 500 | 98 |

Having thus described our invention, what we claim and desire to protect by Letters Patent is:

1. The method of controlling fungi on plants which comprises applying to plants an alpha-chlorophenyl-beta-chlorosuccinimide.

2. The method of controlling fungi on plants which comprises applying to plants a chemical having the general formula

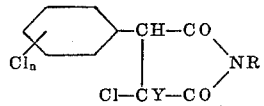

wherein $n$ is an integer from 1 to 3, Y is selected from the group consisting of hydrogen and methyl, and R is selected from the group consisting of hydrogen and alkyl radicals having 1 to 6 carbon atoms.

3. The method of controlling fungi on plants which comprises applying to plants alpha-(4-chlorophenyl)-beta-chlorosuccinimide.

4. The method of controlling fungi on plants which comprises applying to plants alpha-(2,4-dichlorophenyl)-beta-chlorosuccinimide.

5. The method of protecting seeds against fungi which comprises coating the seed with an alpha-chlorophenyl-beta-chlorosuccinimide.

6. The method of protecting seeds against fungi which comprises coating the seed with a chemical having the general formula

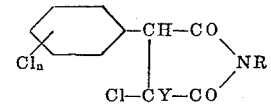

wherein $n$ is an integer from 1 to 3, Y is selected from the group consisting of hydrogen and methyl, and R is selected from the group consisting of hydrogen and alkyl radicals having 1 to 6 carbon atoms.

7. The method of protecting seeds against fungi which comprises coating the seed with alpha-(4-chlorophenyl)-beta-chlorosuccinimide.

8. The method of protecting seeds against fungi which comprises coating the seed with alpha-(2,4-dichlorophenyl)-beta-chlorosuccinimide.

9. The method of suppressing the growth of fungi on growing plants which comprises spraying growing plants with an alpha-chlorophenyl-beta-chlorosuccinimide.

10. The method of suppressing the growth of fungi on growing plants which comprises spraying growing plants with a chemical having the general formula

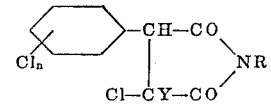

wherein $n$ is an integer from 1 to 3, Y is selected from the group consisting of hydrogen and methyl, and R is selected from the group consisting of hydrogen and alkyl radicals having 1 to 6 carbon atoms.

11. The method of suppressing the growth of fungi on growing plants which comprises spraying growing plants with alpha-(4-chlorophenyl)-beta-chlorosuccinimide.

12. The method of suppressing the growth of fungi on growing plants which comprises spraying growing plants with alpha-(2,4-dichlorophenyl)-beta-chlorosuccinimide.

13. A fungicidal composition comprising an alpha-(halophenyl)-beta-chlorosuccinimide and a surface-active wetting agent.

14. A fungicidal composition comprising a chemical having the general formula

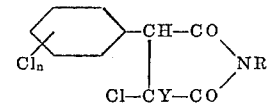

wherein $n$ is an integer from 1 to 3, Y is selected from the group consisting of hydrogen and methyl, and R is selected from the group consisting of hydrogen and alkyl radicals having 1 to 6 carbon atoms, said composition containing a surface-active wetting agent.

15. A fungicidal composition comprising alpha-(4-chlorophenyl)-beta-chlorosuccinimide and a surface-active wetting agent.

16. A fungicidal composition comprising alpha-(2,4-dichlorophenyl)-beta-chlorosuccinimide and a surface-active wetting agent.

17. A fungicidal composition comprising an alpha-chlorophenyl-beta-chlorosuccinimide and a powdered mineral silicate.

18. A fungicidal composition comprising a chemical having the general formula

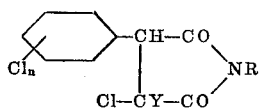

wherein $n$ is an integer from 1 to 3, Y is selected from the group consisting of hydrogen and methyl, and R is selected from the group consisting of hydrogen and alkyl radicals having 1 to 6 carbon atoms, said composition containing a powdered mineral silicate.

19. A fungicidal composition comprising alpha-(4-chlorophenyl)-beta-chlorosuccinimide and a powdered mineral silicate.

20. A fungicidal composition comprising alpha-(2,4-dichlorophenyl)-beta-chlorosuccinimide and a powdered mineral silicate.

References Cited in the file of this patent

UNITED STATES PATENTS

| | | |
|---|---|---|
| 2,205,558 | Flett | June 25, 1940 |
| 2,726,981 | Wolf et al. | Dec. 13, 1955 |
| 2,898,266 | Gates | Aug. 4, 1959 |